350-174
5/15/79  OR  4,154,507
SR

United States Patent [19]
Barr

[11] 4,154,507
[45] May 15, 1979

[54] OPTICAL COMBINER/DISTRIBUTOR USING V-SHAPED MIRROR ASSEMBLY

[75] Inventor: Orville C. Barr, Richland, Wash.

[73] Assignee: Jersey Nuclear-Avco Isotopes, Inc., Bellevue, Wash.

[21] Appl. No.: 858,609

[22] Filed: Dec. 8, 1977

[51] Int. Cl.² .................. G02B 27/14; G02B 27/17
[52] U.S. Cl. ................................. 350/174; 350/6.9
[58] Field of Search ............... 350/6.9, 6.7, 6.1–6.5, 350/285, 169–174, 299, 294; 331/94.5 Q, 94.5 C, 94.5 K

[56] References Cited
U.S. PATENT DOCUMENTS

| | | | |
|---|---|---|---|
| 3,881,802 | 5/1975 | Helava | 350/28 S |
| 3,970,963 | 7/1976 | Chester | 331/94.5 C |

OTHER PUBLICATIONS

Parkes, G. L., IBM Tech. Dis. Bull., "Optical Amplifier", vol. 4, No. 4, Sep. 1961, p. 46.

Primary Examiner—Jon W. Henry
Attorney, Agent, or Firm—Weingarten, Maxham & Schurgin

[57] ABSTRACT

An optical combiner for combining multiple synchronized, pulsed light beams is disclosed. A pair of planar mirrors are joined, facing each other, along an edge of each, to form a V-shaped assembly rotatable about an axis normal to the line of intersection of these edges, passing through the center of that line and bisecting the center of the angle formed between the two mirrors. A plurality of pulsed laser beams is impinged upon such mirror assembly as it rotates, the lasers each being pulsed at a rate equal to an even integral multiple of the rotational speed of the mirror assembly in synchronism with the rotation of the mirror assembly. The individual incident laser beams are combined by the mirror assembly and emitted as a single pulsed laser beam having a pulse repetition rate equal to the product of the number of incident beams multiplied by the pulse rate of each such beam. Conversely, the same V-shaped mirror assembly provides a distribution function for separating a single pulsed laser beam into a plurality of more slowly pulsed beams. Separate beams may simultaneously be combined and distributed when timing requirements are satisfied. Systems of multiple mirror assemblies are also shown.

30 Claims, 10 Drawing Figures

OPTICAL COMBINER/DISTRIBUTOR USING V-SHAPED MIRROR ASSEMBLY

FIELD OF THE INVENTION

This invention relates to optical combiners and distributors for pulsed laser beams and, in particular, to a rotating optical combiner/distributor employing V-shaped mirrors.

BACKGROUND OF THE INVENTION

In systems which employ a pulsed beam of laser radiation, it has often been found desirable to provide a laser beam pulsed at a rate significantly more rapid than the pulse rates available with any single useful laser. To provide the desired rapidly pulsed beam, techniques and apparatus have been developed for combining two or more separately generated laser beams, each pulsing slower than the desired rate, into a composite beam which will provide a pulse whenever there is a pulse available from any of the input beams, thereby providing a beam having the desired pulse rate.

Conversely, it has been desirable to be able to perform the reverse transposition, i.e., commutating a single, rapidly pulsing laser beam into a number of separate beams of slower pulse rates. Techniques have thus been developed for decomposing a periodically pulsed beam into multiple "component" beams, and for the distribution of the plurality of beams so created.

Optical beam combiners as well as beam splitters or distributors of both the rotating and nonrotating types are known in the prior art. Many of such prior art designs utilize refractive optics, however. The optical glass required for the refractive elements of such systems is generally of sufficient size and mass as to impose significant limitations on rotational speeds which may be employed; exceeding such maximum usable speeds will subject the glass elements to forces they are incapable of withstanding. And, even in purely reflective systems, excessive rotational speeds may induce distortion in mirror surfaces as a result of the centrifugal induced by rotation.

Optical efficiency is also important when the laser pulses each have high average power, for both refractive and reflective optics. Non-zero optical losses will result in optical distortion due to thermally induced deviations of both reflective surfaces and transmissive optical elements. Further, such losses give rise to problems regarding the removal of the resulting heat flux through the surface areas of the optical elements.

BRIEF SUMMARY OF THE INVENTION

These and other problems of prior art beam combiners/distributors are significantly alleviated by the present invention which typically requires only two reflective surfaces and no refractive elements. The two reflective surfaces are each significantly larger in surface area than the region which is illuminated at any time by an incident laser beam; also, each incident beam impinges upon a different region of the mirror surfaces. This combination of factors helps to distribute the heat load on the mirror surfaces and permits the use of a higher average optical power as compared to simple rotating mirror combiners and distributors.

In a preferred embodiment, the present invention comprises a pair of planar mirrors which intersect in a right angle, forming a V-shaped assembly with the reflective surfaces of the mirrors facing inwardly, toward each other. The mirrors are rotated about an axis which is normal to the line of intersection of their surfaces, bisects the included angle therebetween and passes through the center point of that line. When used as a combiner, a number of pulsed laser beams are each impinged upon such mirror assembly from directions parallel to the axis of rotation thereof and in synchronism with the rotation of the mirror assembly. Such incident beams are reflected from a first mirror of the pair of mirrors comprising the V-shaped assembly onto the second mirror of the V-shaped assembly and therefrom into the combined output beam. This composite beam will propagate outwardly from the combiner along a path parallel to the axis of rotation, oppositely directed from the incident component beams.

When used as a distributor, the input beam is oppositely propagated as compared to the aforesaid combined output beam, and the multiple output beams will emerge from the mirror assembly oppositely directed but on the same ray paths as the incident beams in the combiner mode.

In alternate embodiments, the included angle between the two mirrors of the V-shaped assembly may be other than 90° with the beams appropriately displaced from the positions appropriate when the angle included between the mirrors is 90°.

BRIEF DESCRIPTION OF THE DRAWING

These and other features of the present invention are more fully described below in the detailed description of the preferred embodiment, presented for purposes of illustration and not by way of limitation, and in the accompanying drawings of which.

DETAILED DESCRIPTION OF THE PRESENT INVENTION

Figure 1:
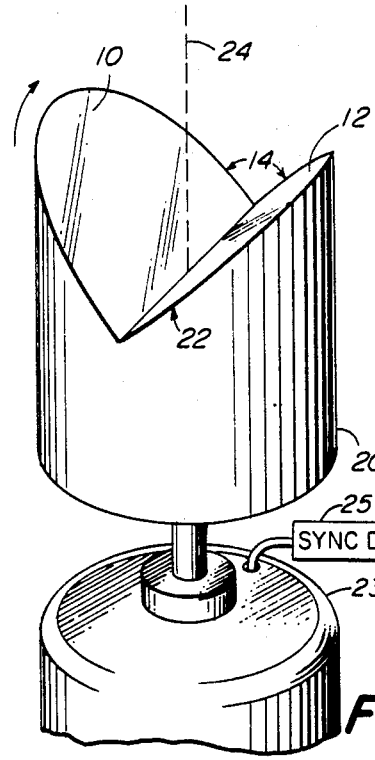
FIG. 1 is a pictorial view of the mirror assembly of a preferred embodiment of the present invention.

The present invention contemplates an optical system for combining a plurality of synchronized, pulsed laser beams into a single, composite pulsed laser beam. As more fully explained below, the system may also be used for splitting or decomposing a single regularly pulsed beam into an even integral submultiple number of beams of accordingly reduced pulse rates. In a preferred embodiment, as illustrated in FIG. 1, a pair of planar mirrors 10 and 12 of generally semi-elliptical shape are assembled together along their straight edges to form a V-shaped assembly, with the reflective surfaces of such mirrors facing each other. In the preferred embodiment, the angle 14 included between the mirror surfaces is a right angle, although, as explained below in the discussion of alternative embodiments, other angular relationships may be employed. The mirror assembly is mounted to be rotatable by a motor 23 about an axis 24 normal to the line formed by the juncture of the mirror surfaces, passing through the middle thereof and bisecting the angle included by the mirror surfaces. One suitable structure for supporting the mirror assembly is shown in FIG. 1. This structure comprises a tubular section 20 of either hollow or solid construction. The end of the tubular section is provided with a V-shaped notch 22 having an included angle of 90° and being symmetrical about the longitudinal axis 24 of the tubular member. This notch provides a seat for the mirror assembly. The mirror assembly may be attached to the tubular section in any manner which will withstand the high speed rotation to which the shaft-mirror assembly combination will be subjected, as by the use of adhesives or a mechanical retaining structure.

Figure 2A:
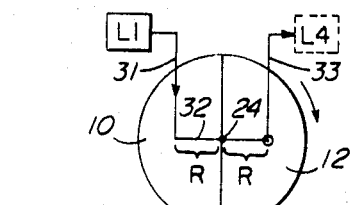
FIGS. 2(A)–2(C) are top plan views of the mirror assembly of the present invention, at three different sequential rotational positions.
Figure 2B:
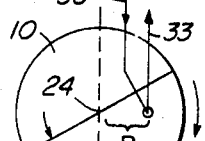
Figure 2C:
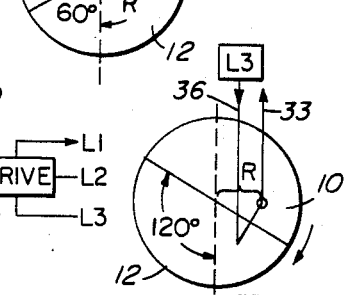

The operation of the rotating V-shaped mirror assembly as a beam combiner may best be understood from a description of the events illustrated in FIGS. 2(A)-2(C). These figures illustrate the use of a single V-shaped mirror assembly to combine three synchronized, pulsed laser beams into one interleaved, composite beam.

At some time, $T_1$, the mirror assembly will be in a rotational position as shown in FIG. 2(A). At such instant, a first laser, shown as L1, is synchronized by a sync drive 25 from motor 23 to emit a pulse along ray 31 toward a first mirror 10 of the V-shaped mirror assembly. Ray patch 31 is aligned to be parallel to the axis of rotation of the shaft and mirror assembly and to intersect the first mirror at a distance R from the axis of rotation. The pulse from the first laser will thereby be reflected by first mirror 10 along a line perpendicular to the line of intersection of the two mirrors, onto second mirror 12, such path being illustrated by line 32. In the assumed definition of time $T_1$, line 32 is normal to and passes through the axis 24 of rotation as shown, to facilitate the explanation of operation. Mirror 12 reflects the pulse outwardy therefrom along ray path 33, also parallel to the axis of the mirror assembly. Observe that for $T_1$ as shown, the point of reflection of the pulse from second mirror 12 is symmetrically located about the axis of rotation from the point of incidence on first mirror 10.

For the example illustrated, three pulsed input beams from lasers L1, L2 and L3 are combined into a single output beam, the input beams having equally spaced, equal duration pulses, uniformly interleaved in time. Observe also that the mirror assembly is symmetrical about the line of intersection of the mirrors 10 and 12. Thus, while it is desired to synchronize the input lasers to the rotation of the mirror assembly, the operation of the mirror assembly will be duplicated every 180° of rotation and the drive 25 will thus activate the lasers at equal intervals from each other twice for each revolution of the assembly of mirrors 10 and 12. Therefore, for b input beams, the combiner may accept an input pulse every 180/b degrees of rotation, starting from the position corresponding to $T_1$. The illustrative example relates to the combining of three source lasers, fired in succession at 180°/b = 60° intervals of rotation.

At time $T_2$, illustrated in FIG. 2(B), the V-shaped mirror assembly will have rotationally advanced 60° from its position at time $T_1$. As this position is detected, the sync drive 25 causes the second laser L2 to emit a pulse toward the mirror assembly along ray 35, parallel to and spaced a distance R from the axis of rotation. This pulse impinges upon mirror 10 and is reflected therefrom on a line perpendicular to the line of intersection of the two mirrors, onto the other mirror, 12 from which it is reflected into the combined output beam which propagates outwardly from the apparatus along ray 33.

The mirror assembly continues to rotate until at a later time, $T_3$, it arrives at the position illustrated in FIG. 2(C), 60° advanced from that shown in FIG. 2(B). The third laser L3 thereupon emits a pulse along a ray 36 parallel to the axis of rotation of the mirror assembly, 60° about the mirror axis from ray 35 and also at a distance R from said axis. The pulse from the third laser L3 which propagates toward the combiner along ray 36 will impinge upon the surface of mirror 12 (note the symmetry, mirror 12 now receiving the incident input beam), be reflected on a path normal to the line of intersection of the two mirrors, onto mirror 10, and therefrom into the combined beam.

The process will now be repeated for the next pulse of each of the three lasers with mirror 10 replacing mirror 12 in the above description, and vice-versa.

This system will also operate to combine a plurality of incident pulsed, synchronized light beams into a single, composite output beam even when the included angle between the two plane mirrors is other than exactly 90°. However, if the included angle between the mirrors deviates from 90°, the incident rays can no longer be directed into the mirror assembly on paths parallel to its axis of rotation. Under such circumstances, the directions for the input beams must instead be chosen to lie along a conical surface. More particularly, the directions for the input beams may be chosen according to the rule that they all impinge upon the mirrors from directions that pass through the apex of a right circular cone and lie in the surface defined by such cone, with the defining cone having its axis of symmetry colinear with the axis of rotation of the V-shape mirror assembly. The combined beam will then emerge from the assembly in some constant direction when the time synchronization requirements described above are satisfied; that is, when the rotational speed of the mirror assembly is an integral multiple of one-half the pulse rate of each source laser. While the determination of the proper directions for the component beam rays is more complicated in such an arrangement, this alternative provides more flexibility and space for locating auxiliary optical components which may be utilized to direct the various laser beams.

For a more detailed understanding of the considerations involved in utilizing included angles which deviate from 90°, it is helpful to consider the behavior of the laser beams in two locations: first, at the mirror surfaces or, alternatively, at the projection of the intersection of the beams and the mirrors onto a plane at the vertex of the mirror assembly and normal to its axis of rotation; and second, at a plane in front of the mirror assembly and normal to its axis of rotation ("front plane"). In general, for included angles deviating from 90°, the incident beams define the surface of a cylinder or cone, both usually right, circular and coaxial with the axis of rotation. In general, the beams will have identical sizes at the front plane and, for simplicity, are assumed to be circular in cross-section. The diameters of the beams at the mirrors, $d_m$, must all be similar in order that the combined beam not deviate from pulse to pulse. The diameters of the combined beam, $d_c$, and of the incident beams at the front plane, $d_n$, may be varied according to the optics being employed with the mirror assembly. Two cases are of principal interest: first, the situation wherein the beams are focused near the mirrors, i.e. $d_n$ $\approx d_c > d_m$; and second, the use of collimatd beams wherein $d_n \approx d_c \approx d_m$, limited by diffraction.

The projections of the incident beam will pierce the mirror assembly vertex plane on an approximately circular annulus of diameter $d_m$ having a mean radius $r_m$ and mean circumference $c_m = 2\pi r_m$. Similarly, the incident beams pierce the front plane on an approximately circular annulus of width $d_n$ and mean radius $r_n$ and circumference $c_n$. For flexibility, it is assumed that the directing optics for the beams are located at the front plane and, therefore, that the incident beams may not overlap there. That is, if there are N beams, then $Nd_n < c_n$. Further, the combined beam may not overlap any of the incident beams at the front plane, for similar practical reasons.

If the included angle of the mirror assembly is 90° and if $c_m < 2Nd_m$ then at least one of the incident beams must have its point of incidence on the mirror assembly stradling the line of intersection between the two mirror faces. Any of three possible detrimental effects will occur as a result. First, the beam or beams straddling the intersection will suffer optical loss because a portion of the beam will not be reflected from the finite width of the line of intersection of the mirror halves. Second, much of this optical loss will be absorbed by the mirror structure, leading to thermally induced optical distortions and damage of the mirrors at much lower laser beam power levels than would hold true under circumstances wherein no beam straddles the intersection. Third, if the included angle between the mirrors is not 90°, and differs from 90° by an error of plus or minus $\epsilon$, then the output beam will be split into two components diverging from each other by an angle of $2\epsilon$. If $2\epsilon$ is small compared to the divergence of the output beam, then this splitting effect is negligible. Therefore, it is desirable to maintain the included angle as close to 90° as possible.

Efforts to increase the diameters of the beams at the mirrors, $d_m$, to reduce adverse thermal effects, will also reduce beam divergence. On the other hand, increasing beam divergence to accommodate errors in the included angle will rapidly increase optical losses and thermal effects. It will therefore be desirable in many practical applications for the mirror assembly to be large enough to permit the restriction $c_m > 2Nd_m$, which implies that the mirror diameter, D, must satisfy the relationship $D > d_m(1+2N/\pi)$. This permits the avoidance of the situation in which any beams straddle the intersection between the two mirrors. Adequate allowance must be made for optical alignment errors, pulse timing errors, and mirror rotation during the optical pulse duration in order to guarantee that this condition is satisfied. For this reason, the equality sign is omitted in the above equations.

If it is assured that no beam will overlap the intersection of the mirror faces, then the tolerance on the included angle is relaxed. Deviation of the included angle from 90° would then simply impose a requirement that the incident beams lie in a locus approximating a conical shape. The combined beam will be directed on a path which is not parallel to the incident beams, being skewed from their conical locus by an angle of $2\epsilon$.

The use of an included angle of less than 90° will cause the incident beams to pierce the front plane nearer the location where the combined beam pierces it than for an included angle of 90°, possibly leading to undesired overlapping. The use of an included angle exceeding 90° will open up a gap in the region on the front plane pierced by the incident beams. Therefore, the use of included angles exceeding 90° will generally be more advantageous than the use of included angles of less than 90°. However, if the included angle is increased too much, one or more of the incident beams may impinge upon only one of the two mirror surfaces. In this limit, additional restrictions must be imposed on the matching of the angles between the mirror faces and the axis of rotation.

It should also be realized that fundamental limits are imposed by the motion of the beams which results from the rotation of the mirror assembly during the finite duration in which the pulses are applied thereto. The mirror assembly sweeps the beam locus on the front plane once per single beam pulse repetition interval. If N beams, each of repetition rate r, are being combined into a beam of repetition rate R, where $R = Nr$, then during the pulse repetition interval of the combined beam, $1/R$, the scan extends from the center of one of the incident beams at the front plane to the center of an adjacent incident beam, a distance (for large N) of $c_n/N$. If the duration of a pulse is w, the scan during a pulse is simply wR times the scan during $1/R$. Thus, $$wRc_n/N = wrc_n$$

this may be best understood as a function of the beam aperture, $d_n$, as follows:

$$\text{scan/aperture} = wrc_n/d_n.$$

It follows that if w is a significant fraction of $1/R$, it becomes important to insure the presence of a minimum unused aperture between the incident beams at the front plane; that is, $$Nd_n \rightarrow c_n,$$

where the arrow indicates that the first quantity approaches, in the limit, the second quantity. The ratio of scan to aperture is thus minimized, approaching the theoretical minimum $$\text{scan/aperture} = w\overline{rc}_n/d_n \rightarrow wrNd_n/d_n = wR.$$

The rotating mirror assembly described herein can also be utilized as a distributor (or "separator" or "splitter") to break apart one pulsed laser beam of repetition rate p into a number, n, of separate laser beams, each with a repetition rate p/n. Operation of the mirror assembly in the separating or distributing mode is the same as in the combining mode. The change is that input becomes output, and vice versa. More specifically, the input beam from a laser L4 which is to be split into multiple, more slowly pulsed beams, is directed into the mirror assembly on precisely the same path as that on which a combined beam would be emitted therefrom in the combining mode. Only the direction of propagation is reversed. Likewise, the resulting plural output beams will emerge on paths which would be those designated for input beams were operational modes reversed. Moreover, this structure can be utilized for simultaneously combining one system of beams while distributing a second system of beams or for simultaneously combining several independent systems of beams 70 and 72 shown in FIG. 4 from laser systems 74 and 76 respectively, each into its own single output beam 78 and 80 respectively, or for distributing several systems of beams each from its own single source beam into multiple output beams. In fact, any combination of beam systems may be simultaneously combined and distributed as described above subject only to each system of laser beams having a pulse rate compatible with the rotation rate of the commonly shared rotating mirror assembly, for proper synchronization therewith.

The V-shaped mirror assembly of the present invention may be rotated at any integral multiple of the minimum rotation rate described above in connection with the description of FIGS. 2(A)–2(C). That minimum rate for any system of laser beams is one-half the pulse rate of any one beam impinging upon the rotating mirror assembly prior to combination into the single, composite output laser beam. When only one system of laser beams is being combined or distributed, there is no advantage to operation at higher than the minimum rotational speed. However, if a single rotating mirror assembly is used to simultaneously combine and/or distribute more than one system of such laser beams, it is then most advantageous to rotate the mirror assembly at the minimum speed defined by the highest repetition rate system of beams. The other systems of beams simultaneously impinging upon the rotating mirror assembly can each individually and separately operate at any repetition rate that is equal either (1) to the highest repetition rate compatible with the rotation speed or (2) any integral submultiple of that highest repetition rate. That is, if the highest repetition rate system of beams provides r pulses per second, then the mirror assembly may rotate no slower than r/2 revolutions per second. The other systems of beams may then simultaneously make use of the mirror assembly provided each and every such system individually and indepently operates at some repetition rate equal to r divided by an integer. Additionally, it should be noted that r is not necessarily an integer and the optimum practice would be to select the smallest value of r that meets the necessary conditions.

It is further to be noted that the light beams to be combined and/or distributed by the V-shaped mirror assembly can be any satisfactorily synchronized pulsed light beam, and need not be limited to origination from a laser source.

Also, there is no requirement that the pulses in the combined beam be uniformly spaced in time. However, within one system of pulsed lasers, no two lasers whose pulses occur simultaneously or overlap in time can successfully be combined into a single beam. Similarly, when used as a distributor for breaking apart one beam into multiple beams, a single input pulse cannot be divided into two or more of the distributed beams. In addition, the system need not properly combine nor distribute any beam which impinges upon the mirror assembly when the optical projection of such beam on the mirror assembly is appreciably cut by the line of intersection of the two mirrors.

Figure 3:
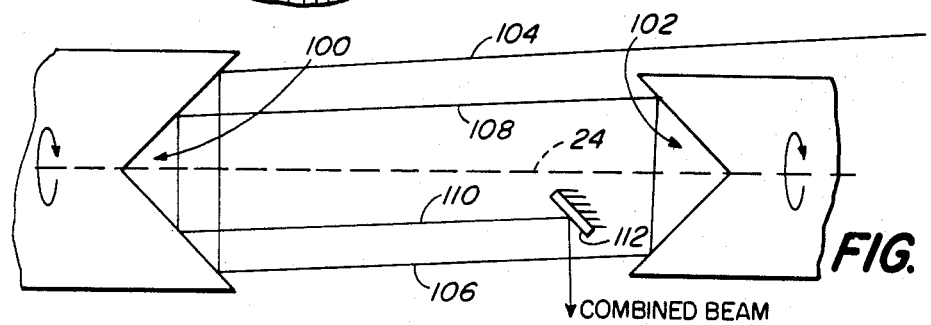
FIGS. 3–5 are diagrammatic illustrations of alternative embodiments of the present invention, showing the use of multiple V-shaped mirror assemblies to further reduce rotation rate requirements.
Figure 4:
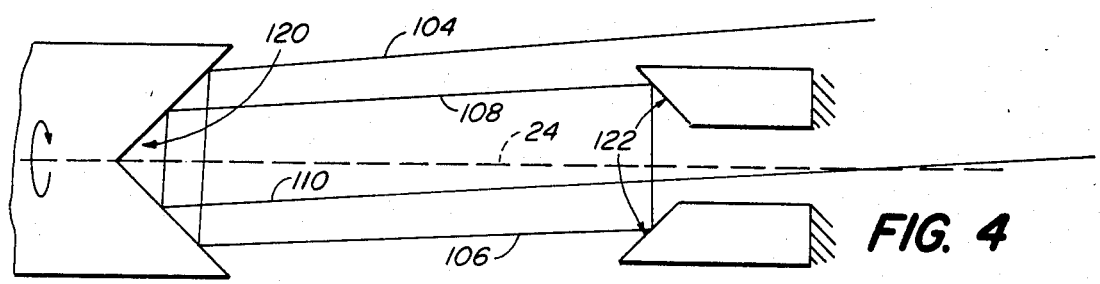
Figure 5:
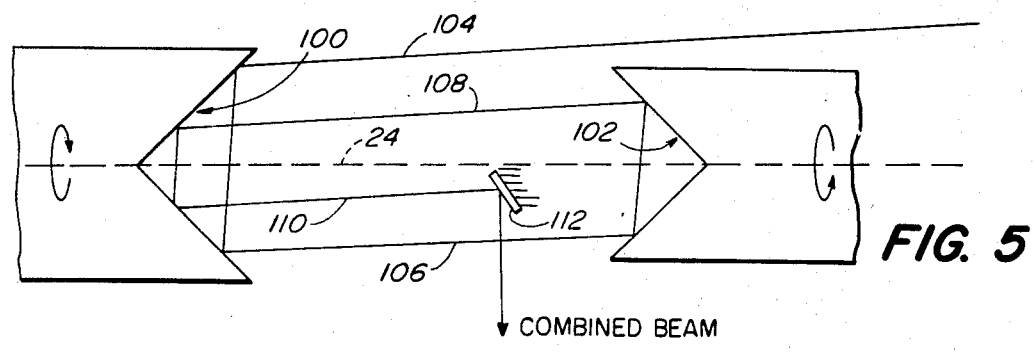
Figure 7A:
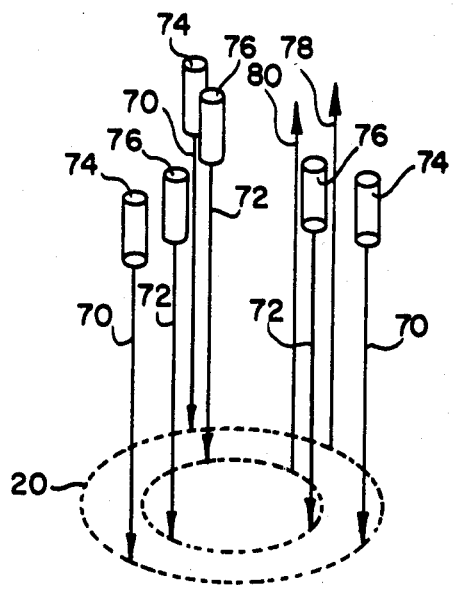
FIGS. 7A and 7B illustrate combining plural beam sets.
Figure 7B:
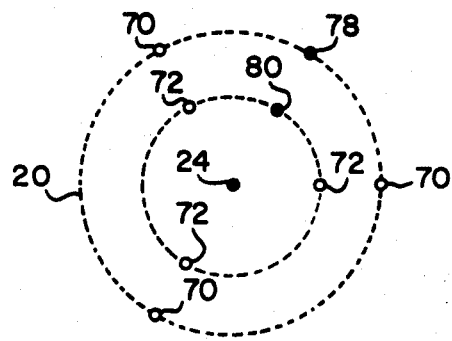

As illustrated in FIGS. 3–5, two V-shaped mirror assemblies may be combined to achieve more than two scans per rotation. Increasing the number of scans per rotation permits the rotational speed to be reduced for given pulse rates. In general, this is desirable since rotation produces inertial forces which, in turn, induce stresses in the rotating elements. These stresses deform the optical surfaces and, in the extreme, result in yielding and failure of the structure. Since the inertial forces are a function of the structure's size, shape and rotational speed, it becomes more important to reduce rotational speed as the size of the assembly increases. FIGS. 3 and 4 illustrate embodiments which scan the incident beams four times per rotation, while the embodiment of FIG. 5 scans the beams six times per rotation. If each component beam has a pulse repetition rate r, the basic embodiment of FIG. 1 must rotate at a minimum of 0.5 r revolutions per second. The assemblies of FIGS. 3 and 4 need rotate at only one-half of this speed, 0.25 r, while that of FIG. 5 can rotate at one-third thereof, 0.17 r. However, mirror size must vary inversely with the rotation ratio in order to avoid interference between the beams. Specifically, the embodiments which scan four times per rotation require mirrors at least twice as large as that which scan at only twice per rotation, while the embodiment which scans six times per rotation requires a mirror at least three times as large as the basic assembly. Moreover, local deformation near the outer edges of the mirrors varies directly with the centrifugal force per unit volume, which in turn varies according to the well-known $\omega^2 \alpha$ relationship, where $\omega$ is proportional to the angular rotation rate and $\alpha$ is the radius from the axis of rotation. Stress near the axis of rotation derives from an integration of the forces throughout the structure and varies approximately as $\omega^2 \alpha^2$. Table I summarizes and compares these effects among the various embodiments described both above and below.

TABLE I

| Scheme | relative speed | relative diameter | relative peak centrifugal force | relative peak stress near axis |
|---|---|---|---|---|
| simple mirror | 1 | 1 | 1 | 1 |
| FIG. 1 | 0.5 | 2 | 0.7 | 1 |
| FIG. 3 | 0.25 | 4 | 0.5 | 1 |
| FIG. 4 | 0.25 | 4 | 0.5 | 1 |
| FIG. 5 | 0.17 | 6 | 0.4 | 1 |

It should also be noted that whereas the apparatus of FIG. 1 reflects the laser beams twice as they pass through the apparatus, the embodiments of FIGS. 3, 4 and 5 all require six reflections, tripling the optical losses incurred due to mirror absorption and scattering.

Referring now to FIG. 3, it may more particularly be noted that the structure there shown comprises a pair of the above-described 90° included angle mirror assemblies 100, 102. The mirror assemblies are coaxial and are made to rotate in synchronism with each other. The constraint imposed by symmetry is that the incident beams are equally spaced along a semicircular locus, rather than around a full circle. Further, the incident beams must impinge upon mirror assembly 100 in a direction skewed from the axis of rotation, rather than parallel thereto. An incident beam impinging on mirror assembly 100 along a ray path 104 will be reflected therefrom along a ray path 106 parallel to ray path 104. Likewise, ray path 108 will be parallel to ray path 106 and ray path 110. So long as mirror assembly 102 intercepts ray path 106, the result will be inward "spiralling" as shown. The combined beam may be extracted by placing a small stationary mirror 112 in a position to intercept ray path 110 and deflect the light beam incident thereon out of the region between the mirror assemblies. It is noted further that the diameter of mirror assembly 102 may be smaller than that of mirror assembly 100 due to the orientation of ray path 106.

The apparatus of FIG. 4 also includes two V-shaped mirror assemblies. In this embodiment, however, only one of the mirror assemblies 120 rotates. The other mirror assembly 122 comprises a stationary, truncated V-shaped arrangement in which a center portion toward the vertex of the V has been removed, permitting the combined beam to exit from the apparatus through the opening thereby created, without the use of a mirror as employed in the previously described embodiment. Further distinguishing from the embodiment of FIG. 3, it is to be noted that the numerous component beams are spaced around a circular locus rather than being limited to a semicircular locus.

In still another variation, as shown in FIG. 5, synchronously counterrotating the two mirror assemblies previously described in relation to FIG. 3 will provide a six scan per rotation capability, with the component beams being equally spaced around a circular locus.

Figure 6:
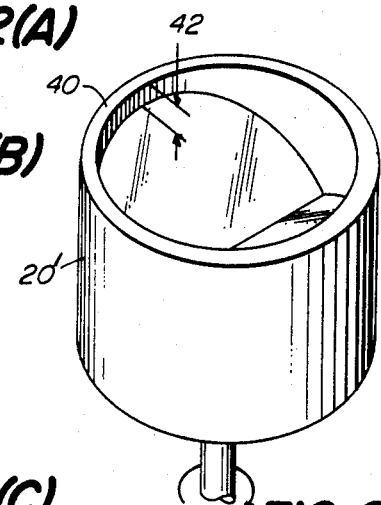
FIG. 6 is a diagrammatic illustration showing apparatus for shielding the mirror assembly of the present invention

It has been observed that rotation of the V-shaped mirror assembly at several hundred rps, a typical speed range for combining pulsed laser beams, considerable motion is induced in the atmospheric gases in the vicinity of the mirror surfaces. This motion generally comprises a gaseous flow which approaches the mirror assembly along its axis of rotation and then moves radially outward along the line of intersection of the mirrors. This centrifugally induced gas flow deposits atmospheric contaminants such as dust, microparticles and oil droplets onto the optical mirror surfaces. The mirror surfaces degrade as a result of becoming both abraded and coated by these particulates. To reduce the rate of comtamination and erosion, it is necessary to reduce the rate of gaseous flow over the combiner mirror surfaces. This has been achieved as shown in FIG. 6 by mounting the V-shaped mirror assembly in a recess in the end of cylinder 20'. A cylinder of slightly larger diameter than that of the mirror assembly is required in this embodiment. The excess diameter will form an annular shoulder 40 in the end of the cylinder. Recess depth 42 may be as large as desired when the angle between the mirrors is 90°; when a non-90° angle is employed, however, if recess depth 42 is too great, it will not be possible to position the incident beams as described above. Obviously, care must be taken to ensure that no beam will be blocked by the uneven edge of shoulder 40.

As used above in describing the invention, and below in the claims, the term "commutation" is employed herein to indicate both the transposition from a single beam into multiple beams as well as the transposition from multiple beams into a single beam by the repetitive, sequential operation on pulses herein described.

Having described above a preferred embodiment for the present invention as well as an alternative thereto, it will occur to those skilled in the art that modifications to the disclosed apparatus may be made within the spirit of the invention. It is accordingly intended to limit the scope of the invention only as indicated in the following claims.

What is claimed is:

1. A system for optical commutation between a single optical beam path and plural optical beam paths, said system comprising:
    means for defining the times of occurrence for pulses in said plurality of paths and said single path in a repeating sequence;
    at least one V-mirror assembly having first and second reflecting surfaces inclined to and facing each other at approximately 90°; and
    means for rotating at least one of said V-mirror assemblies in response to and in synchronism with the defined times of occurrence of said pulses to provide thereby an optical path between said single path and respective ones of said plural paths, in a predetermined sequence and providing reflection at different points of said first and second reflecting surfaces for radiation of each of said plural optical paths.

2. The system of claim 1 further including:
    a source of pulsed radiation for applying said pulsed radiation to said mirror assembly along said single optical beam path, whereby the rotation of said V-mirror assembly causes sequential pulses from said single beam path to be directed along distinct ones of said plural beam paths in a predetermined, repeating sequence.

3. The system of claim 1 further including:
    plural sources of pulsed radiation (providing) operative in response to the defined times of pulse occurrence to provide pulsed radiation to said mirror assembly along corresponding ones of said plural optical beam paths;
    said plural radiation sources being thereby operative to provide pulses of radiation in a predetermined sequence, in synchronization with the rotation of said mirror assembly, whereby the rotation of said V-mirror assembly directs the pulses in sequence from said plural beam paths onto said single beam path.

4. Apparatus for commutating repetitively pulsed light beams between a single optical beam path and a plurality of optical beam paths, the pulsing of the beams in said plurality of paths occurring at a rate slower than the pulse rate of the beam of said single path and at distinct times, said apparatus comprising:
    first and second reflective elements;
    each of said reflective elements having a reflective surface bounded by a substantially straight edge;
    said first and second elements abutting each other along the straight edge of each, the reflective surfaces of said elements facing each other, to include an angle of about 90° therebetween;
    the reflective elements so arranged being rotatable about an axis normal to the line of intersection of their straight edges, passing throught the center of that line and bisecting said angle; (and)
    means for defining the times of occurrence for pulses in said plurality of paths and said single paths in a repeating sequence;
    means for (synchronously) rotating said elements about said axis in response to and in synchronism with the defined times of occurrence of said pulses to provide, in sequence, an optical path between said single path and each of said plurality of paths and providing reflection at different points of said first and second reflecting surfaces for radiation of each of said plural optical paths.

5. The apparatus of claim 4 wherein means are provided to generate the pulses of the light beam of said single path at a first rate and to direct them upon at least one of said reflective elements to distribute them onto said plurality of optical beam paths, the beam of each of said plurality of paths having pulses occurring less frequently than said first rate.

6. The apparatus of claim 4 wherein said reflective elements are planar mirrors.

7. The apparatus of claim 6 wherein said mirrors are semi-elliptical in shape.

8. The apparatus of claim 6 wherein the surface area of each mirror is much larger than the region thereof illuminated by any of said light beams.

9. The apparatus of claim 6 wherein the beam associated with said single optical beam is produced by a pulsed laser source.

10. The apparatus of claim 9 wherein said reflective elements are planar mirrors.

11. The apparatus of claim 10 wherein the pulse rate of the beam associated with said single optical beam path is an even integral multiple of the rotational speed of the reflective elements.

12. The apparatus of claim 11 further including means for shielding the surfaces of the mirrors from the impact of matter present in the surrounding environment.

13. The apparatus of claim 12 wherein said shielding means comprises an annular member adapted to receive the mirrors within a central aperture thereof.

14. The apparatus of claim 4 further including a pulsed light source associated with each one of said plurality of optical beam paths for providing spatially separate beams of light pulses in a synchronized time sequence, sequentially impinging upon said rotating reflective elements for deflection therefrom onto said single path.

15. The apparatus of claim 14 wherein said plurality of optical beam paths is disposed about a cylindrical locus coaxial with the axis of rotation of said reflective elements.

16. The apparatus of claim 14 wherein said reflective elements are planar mirrors.

17. The apparatus of claim 16 wherein said mirrors are semi-elliptical in shape.

18. The apparatus of claim 16 wherein the surface area of each mirror is much larger than the region thereof illuminated by any of said light beams.

19. The apparatus of claim 16 wherein each of said plurality of light beams is provided by a laser source.

20. The apparatus of claim 19 wherein the pulse rate of said single path beam is an even integral multiple of the rotational speed of the reflective elements.

21. The apparatus of claim 19 further including means for shielding the surfaces of the mirrors from the impact of matter present in the surrounding environment.

22. The apparatus of claim 21 wherein said shielding means comprises an annular member adapted to receive the mirrors within a central aperture thereof.

23. Apparatus for commutating between a single optical beam path and a plurality of optical beam paths, each beam path being associated with a repetitively pulsed light beam, the beam associated with each of said plurality of paths being pulsed at a rate slower than the pulse rate of the single beam and at a time distinct from the beams associated with others of said plurality of paths, said apparatus comprising:

first and second pairs of reflective elements;
each of said reflective elements having a reflective surface bounded by a substantially straight edge;
the reflective elements of each of said pairs being abutted to each other along said straight edge of each, the reflective surfaces of said elements facing each other, to include an angle of about 90° therebetween;
said pairs of reflective elements being rotatable about a common axis normal to the lines of intersections of the straight edges of the reflective elements, passing through the centers of those lines and bisecting said angle;
said pairs of reflective elements being spaced apart longitudinally, along said axis, facing toward each other;
means for rotating said pairs of reflective elements in opposite directions about said axis in predetermined synchronization with the pulsing of one of the light beams, to provide an optical path between said single optical beam path and each of said plurality of optical beam paths in a predetermined sequence corresponding to the times of occurrence of light beam pulses on each of said plurality of optical beam paths;
said optical path including reflection by a reflective element of each of said pairs of reflective elements.

24. The apparatus of claim 23 wherein said optical path includes means for altering the direction of a pulsed beam on said path to provide a path between one of said reflective elements and a region exterior to that between said pairs of elements.

25. Apparatus for commutating between a single optical beam path and a plurality of optical beam paths, each beam path being associated with a repetitively pulsed light beam, the beams of each of said plurality of paths being pulsed at a rate slower than the pulse rate of the beam associated with said single path and a time distinct from the beams associated with others of said plurality of paths, said apparatus comprising:

first and second pairs of reflective elements;
each of said reflective elements having a reflective surface bounded by a substantially straight edge;
the reflective elements of each of said pairs being abutted to each other along said straight edge of each, the reflective surfaces of said elements facing each other, to include an angle of about 90° therebetween;
said pairs of reflective elements being rotatable about a common axis normal to the lines of intersections of the straight edges of the reflective elements, passing through the centers of those lines and bisecting said angles;
said pairs of reflective elements being spaced apart longitudinally, along said axis, facing toward each other;
means for rotating said pairs of reflective elements in the same direction about said axis in predetermined synchronization with the pulsing of one of the light beams, to provide an optical path between said single optical beam path and each of said plurality of optical beam paths in a predetermined sequence corresponding to the times of occurrence of light beam pulses on each of said plurality of optical beam paths;
said optical path including reflection by a reflective element of each of said pair of reflective elements.

26. Apparatus for commutating between a single optical beam path and a plurality of optical beam paths, each beam path being associated with a repetitively pulsed light beam, the beams of each of said plurality of paths being pulsed at a rate slower than the pulse rate of the beam associated with said single path and at a time distinct from the beams associated with others of said plurality of paths, said apparatus comprising:

first and second pairs of reflective elements having a reflective surface bounded by a substantially straight edge;
the reflective elements of said first pair being abutted to each other along said straight edge of each, the reflective surfaces of said elements facing each other, to include an angle of approximately 90° therebetween;

the reflective elements of said second pair being angularly disposed, symmetrically about an axis passing through and normal to the abutting edge of each of said first pair of reflective elements, the angle between the reflective elements of said second pair having its vertex on said axis and facing said first pair of elements;

the reflective elements of said second pair forming a central aperture through which said single optical beam path passes;

means for defining the times of occurrence of the pulses in said plurality of paths and said single path in a repeating sequence;

means for rotating the first pair of reflective elements about said axis to intercept said plurality of optical beam paths;

said rotation means (synchronizing the rotation of the reflective elements of said first pair with the sequence of pulses) operating in response to and in synchronism with the defined times of occurrence of said pulses to provide an optical path for each pulse between said single path and said plurality of paths, said optical path including reflection by each of said reflective elements of both said first and second pairs.

27. Apparatus for combining a plurality of pulsed light beams comprising:

a first plurality of pulsed light sources for providing spatially separate beams of light pulses in a time sequence;

the beams of light being parallel to each other and distributed around a central axis so as to lie in a cylindrical locus whose axis is the central axis; and means including a multi-reflective surfaced V mirror for receiving the sequence of spatially separate beams of light pulses to (deflect) reflect the separate beams of light pulses at angles insensitive to the frequency of the light pulses in said beams onto a common path parallel to each of the plurality of beams but oppositely propagating with respect thereto(.); the reflection being at different positions on the surfaces of said V mirror for each of the plurality of beams.;

a second set of a plurality of pulsed light sources for providing spatially separate beams of light pulses in a second time sequence and at substantially the same frequency;

the beams of light of said second set being parallel to each other and distributed around a central axis so as to lie in a second cylindrical locus outside said first cylindrical locus and with an axis which is the central axis;

said receiving means receiving the second plurality of spatially separate beams of light pulses to (deflect) reflect them onto a second common path parallel to each of the plurality of beams while oppositely propagating with respect thereto, whereby the separate beams provided by the second set of light sources are combined into a single beam;

the reflection of the second plurality of beams being at distinct positions on said surfaces of said V mirror for each of said plurality of beams.

28. A system for separating a beam of repetitively pulsed radiation into a plurality of spatially separate beams of repetitively pulsed radiation comprising:

a source of repetitively pulsed radiation;

means for receiving the beam of pulsed radiation from said source and for deflecting said beam in sequence into a plurality of spatially separate paths, to provide a plurality of spatially separate pulsed beams of radiation; and said plurality of spatially separate beams being parallel to each other and distributed around a centrol axis as to lie in a cylindrical locus whose axis is the central axis, the beam provided by said source also being parallel to the central axis, and the plurality of spatially separate beams oppositely propagating in direction from the beam provided by said source.

29. The system of claim 28 wherein the means for receiving the repetitively pulsed beam of radiation from the source comprises a V-shaped mirror assembly rotatable about said central axis.

30. The system of claim 28 further including means for rotating said mirror assembly about said central axis in synchronism with the repetitively pulsed beam provided by the source.

* * * * *

UNITED STATES PATENT AND TRADEMARK OFFICE
CERTIFICATE OF CORRECTION

PATENT NO. : 4,154,507
DATED : May 15, 1979
INVENTOR(S) : Orville C. Barr

It is certified that error appears in the above—identified patent and that said Letters Patent is hereby corrected as shown below:

| | | |
|---|---|---|
| Column 1, | line 41, | "centrifugal induced" should read —centrifugal forces induced—. |
| Column 3, | line 25, | "Ray patch 31" should read —Ray path 31—; and |
| | line 67, | "other mirror, 12 from" should read —other mirror, 12, from—. |
| Column 5, | line 1, | "collimatd" should read —collimated—; and |
| | line 5, | "radius $r_m$" should read —radius $\bar{r}_m$—; and |
| | line 6, | "circumference $c_m = 2 \pi r_m$". should read —circumference $\bar{c}_m = 2 \pi \bar{r}_m$.—; and |
| | line 8, | "radius $r_n$" should read —radius $\bar{r}_n$—; and |
| | line 9, | "circumference $c_n$." should read —circumference $\bar{c}_n$.—; and |
| | line 13, | "$Nd_n < c_n$." should read —$Nd_n < \bar{c}_n$.—; and |
| | line 45, | "restriction $c_m > 2Nd_m$," should read —restriction $\bar{c}_m > 2Nd_m$,—. |

UNITED STATES PATENT AND TRADEMARK OFFICE
CERTIFICATE OF CORRECTION

PATENT NO. : 4,154,507
DATED : May 15, 1979
INVENTOR(S) : Orville C. Barr

It is certified that error appears in the above—identified patent and that said Letters Patent is hereby corrected as shown below:

Column 6, line 21, "$c_n/N.$" should read —$\bar{c}_n/N.$—; and line 25, "$wRc_n/N = wrc_n$" should read —$wR\bar{c}_n/N = wr\bar{c}_n$—; and line 30, "scan/aperture = $wrc_n/d_n.$" should read —scan/aperture = $wr\bar{c}_n/d_n.$—; and Column 8, line 11, "rotation ratio" should read —rotation rate—.
Column 14, line 30 "centrol" should read —central—.

Signed and Sealed this

Twenty-seventh Day of January 1981

[SEAL]

Attest:

RENE D. TEGTMEYER

Attesting Officer     Acting Commissioner of Patents and Trademarks